11/22/83 OR 4,417,137

United States Patent [19]

Lundblad

[11] 4,417,137

[45] Nov. 22, 1983

[54] APPARATUS FOR DISPENSING SHEET-LIKE ELEMENTS FROM A STORE OF SUCH ELEMENTS, FOR EXAMPLE BANKNOTES, TO ONE OF A PLURALITY OF RECEIPT OPENINGS ACCESSIBLE TO, FOR EXAMPLE, CASHIER OR CUSTOMER

[76] Inventor: Leif Lundblad, Häradsvägen 102, S-141 41 Huddinge, Sweden

[21] Appl. No.: 386,813

[22] Filed: Jun. 9, 1982

[30] Foreign Application Priority Data

Jul. 30, 1981 [SE] Sweden ................................ 8104600

[51] Int. Cl.³ .............................................. G06F 15/30

[52] U.S. Cl. ...................................... 235/379; 235/375

[58] Field of Search ................ 235/379, 375; 209/534; 271/1, 3, 4

[56] References Cited

FOREIGN PATENT DOCUMENTS

| | | | |
|---|---|---|---|
| 54-108699 | 8/1979 | Japan | 235/379 |
| 54-151898 | 11/1979 | Japan | 235/379 |
| 55-3008 | 1/1980 | Japan | 235/379 |
| 56-94459 | 7/1981 | Japan | 235/379 |

*Primary Examiner*—Harold I. Pitts

*Attorney, Agent, or Firm*—Sughrue, Mion, Zinn, Macpeak and Seas

[57] ABSTRACT

An apparatus for dispensing sheet-like elements from a store (10) of such elements to one (11) of a plurality of receipt openings (11,12) accessible to a cashier or a customer comprises conveying means (131–134') for conveying the sheet-like elements from the store (10) to a collecting means (15), and from there to the receipt opening (11). The conveying means (131–134') is electronically controlled in a manner to convey, in response to an order for dispensing sheet-like elements, the sheet-like elements dispensed from the store (10) and collected in the collecting means (15), in the form of a bundle, to the receipt opening (11) to which the order has been made.

A conveying means includes a retaining or holding means (16) for each receipt opening (11) and individually alloted thereto, this retaining means being intended to hold the bundle of sheet-like elements for a period of time determined by the electronic control means.

According to one embodiment, the collecting means (15) is common to all receipt openings (11,12) and the retaining means (16) forms a waiting station, arranged to receive and hold the bundle of sheet-like elements fed from the collecting means (15).

According to another embodiment, the retaining means (26) is formed by the aforementioned collecting means, which is thus formed by one of a plurality of collecting means (25,25') individually alloted to a respective receipt opening (11 or 12).

7 Claims, 4 Drawing Figures

APPARATUS FOR DISPENSING SHEET-LIKE ELEMENTS FROM A STORE OF SUCH ELEMENTS, FOR EXAMPLE BANKNOTES, TO ONE OF A PLURALITY OF RECEIPT OPENINGS ACCESSIBLE TO, FOR EXAMPLE, CASHIER OR CUSTOMER

BACKGROUND OF THE INVENTION

1. Field of the Invention

The present invention relates to an apparatus for dispensing sheet-like elements from a store of such elements, for example, banknotes, to one of a plurality of receipt openings in the apparatus, accessible to, for example, a cashier or a customer.

2. Description of the Prior Art

An apparatus of this kind is known, for example, from Swedish Patent Specification No. 7711412-2, said apparatus comprising conveying means for conveying sheet-like elements from the store to a collecting means and from there to the receipt opening, said conveying means being electrically controlled, so as to convey the sheet-like elements dispensed from the store and collected in the collecting means, in response to an order made by the cashier or customer to that receipt opening to which the sheet-like elements have been dispatched in response to the orders given by the cashier or customer.

An apparatus of this kind is required to function swiftly and to be fully secure. The arrangement of two or four mechanically separated receipt openings affords the advantage that if, for some reason or other, a cashier or customer does not remove the bundle of sheet-like elements dispatched to the receipt opening allocated to that particular cashier or customer, sheet-like elements ordered by another cashier or customer and collected in said collecting means can nevertheless be dispatched to another receipt opening, thereby enabling the apparatus to be utilized by other cashiers or customers.

It is possible, however, for a situation to occur, where a collected bundle of sheet-like elements remains in the collecting means while waiting for an all-clear signal from a data processor controlling the apparatus. For example, it may be that a customer wishes to withdraw a given number of banknotes or check, whereupon a check is made through the data processor in order to insure that the customer has the authority to make the withdrawal. As will be understood, this check may take a relatively long time, during which withdrawals through the remaining receipt openings cannot take place. This is a limitation of the known apparatus.

SUMMARY OF THE INVENTION

An object of the present invention is to eliminate the aforementioned limitation or disadvantage of the known apparatus of the kind described. In an apparatus according to the invention, the conveying means comprises one retaining means for each of the receipt openings, said retaining means being alloted to a particular receipt opening and being intended to retain the bundle of sheet-like elements dispatched thereto over a time period determined by the electronic control means. In this way, it is possible to complete a later order via a receipt opening, before an earlier order has been completed through another receipt opening.

The characterizing features of an apparatus according to the invention are set forth in the following claims.

BRIEF DESCRIPTION OF THE DRAWINGS

The invention will now be described in more detail with reference to the accompanying drawings, in which.

DESCRIPTION OF THE PREFERRED EMBODIMENTS

Figure 1:
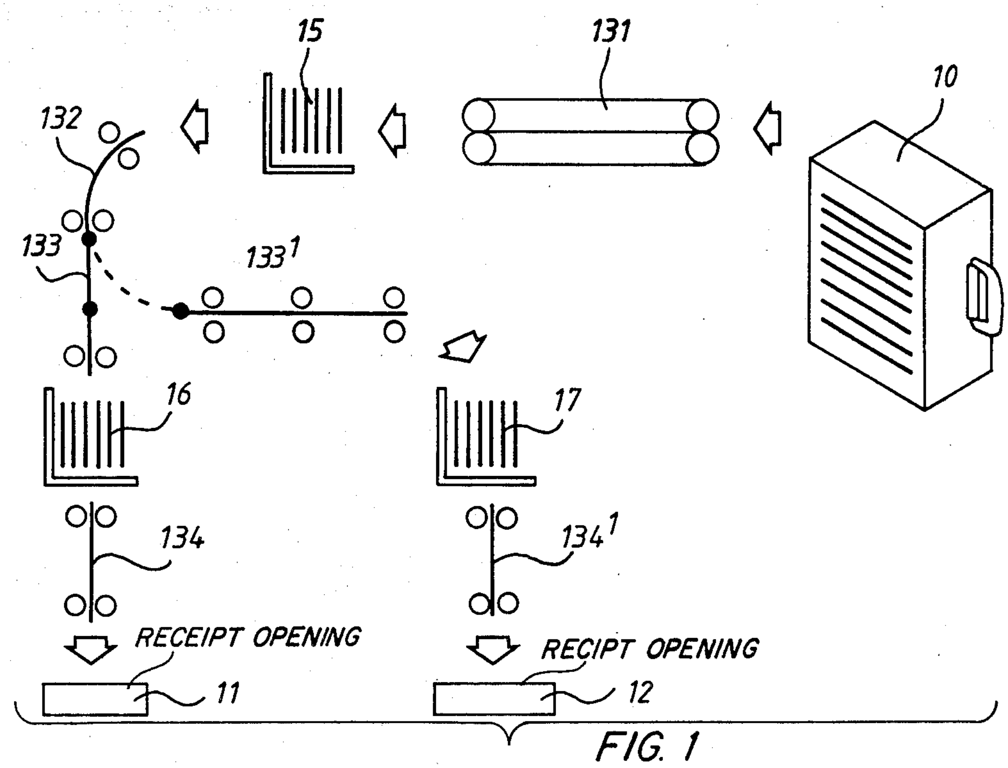
FIG. 1 illustrates schematically an apparatus having two receipt openings, a collecting means and two retaining means.

The apparatus illustrated in FIG. 1 comprises a store 10 of sheet-like elements, for example banknotes, and two receipt openings 11,12 accessible to, for example, a cashier or a customer. The apparatus also comprises conveying means 131–134′, for conveying sheet-like elements from the store 10 to a collecting means or chamber 15, and from there to a retaining means 16 and the receipt opening 11, or alternatively to a retaining means 17 and the receipt opening 12.

Thus, in the embodiment according to FIG. 1 the collecting means 15 is common to both receipt openings 11 and 12, while the retaining means 16 is individually alloted to the receipt opening 11 and arranged to function as a waiting station for receiving a bundle of sheet-like elements dispensed from the common collecting means, and to retain said bundle for a time period determined by the electronic control means. The retaining means 17 is individually alloted to the receipt opening 12, in a similar manner to that described with reference to the retaining means 16.

In brief, an apparatus according to FIG. 1, intended for dispensing banknotes to customers, has the following operational mode: the sum or the number of banknotes required by a customer is entered on a keyboard, whereafter banknotes are dispensed, one at a time, from the store 10 via means 131, to the collecting means 15, and there collected in bundle form. As will be understood, the store 10 may comprise a plurality of part stores arranged to accommodate banknotes of different values. When the customer activates the keyboard, it is predetermined that the bundle of sheet-like elements will alternately be delivered to the receipt opening 11 (and not to the receipt opening 12). When a bundle containing the correct number of sheet-like elements (no double feed) has been collected in the collecting means 15, the bundle is dispatched to the retaining means 16, via means 132 and 133. The bundle of sheet-like elements is held in the retaining or holding means 16 for a time period determined by the electronic control means controlling the various functional steps of the apparatus. It may be necessary, for example, to hold the bundle of sheet-like elements in the means 16 so that a check can be made in one of the data processors to which the apparatus is connected. This check will reveal whether or not the customer has sufficient funds to withdraw the sum ordered by him or her through the apparatus. When this check results in a positive answer, the bundle is conveyed further to the receipt opening 11, via means 134. If the check does not produce a positive result, the bundle of sheet-like elements is conveyed, in a known manner, to a return station arranged within the apparatus, and a signal is sent to the receipt opening 11, causing a message to be given to the effect that the withdrawal cannot be made.

Immediately after the banknotes ordered by the customer have been collected in the collecting means 15, and an all-clear signal has been given for further conveyance of the banknotes to the holding or retaining means 16, it is possible to commence the dispensment of banknotes ordered by another customer on another keyboard. Thus, it is not necessary for the second customer to wait until the transaction ordered by the first customer is fully completed, but that the order by the second customer can commence at the same time as the check is made on the first customer and the banknotes ordered by said first customer are conveyed in the said manner. This means that the apparatus, which is already swift in operation, becomes even more swift, which avoids the formation of queues at the various locations of the dispensing apparatus.

When the banknotes ordered by the second customer have finally been collected in the collecting means 15, the banknotes are conveyed, via means 132 and 133', to the retaining means 17, and from there to the receipt opening 12, via means 134'.

As will be understood, an order given by a third customer can be initially put into effect as soon as the banknotes ordered by the second customer begin to move towards the retaining means 17.

Figure 2:
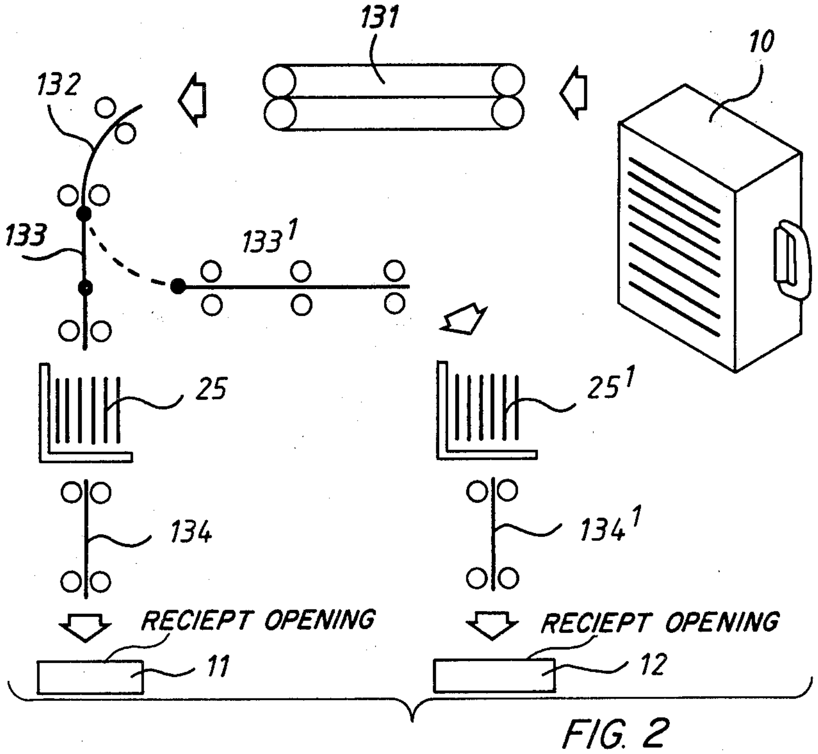
FIG. 2 illustrates an apparatus having two receipt openings and two retaining means which simultaneously form collecting means.

Similarly to the apparatus illustrated in FIG. 1, the apparatus illustrated in FIG. 2 also comprises a store 10, two receipt openings 11,12 and conveying means 131–134'. This conveying means is arranged to convey banknotes, one at a time, from the store 10, via means 131,132,133, and dispatch the banknotes to a retaining or holding means 25 from where the banknotes are dispatched to the receipt opening 11 via means 134, or alternatively to convey banknotes, one at a time, to retaining means 25', via means 131, 132, 133', and from there to the receipt opening 12 via means 134'. In this case, the retaining means 25,25', also function as a collecting means, and are consequently slightly more complicated than the previously mentioned means 16,17 of the FIG. 1 embodiment.

Figure 3:
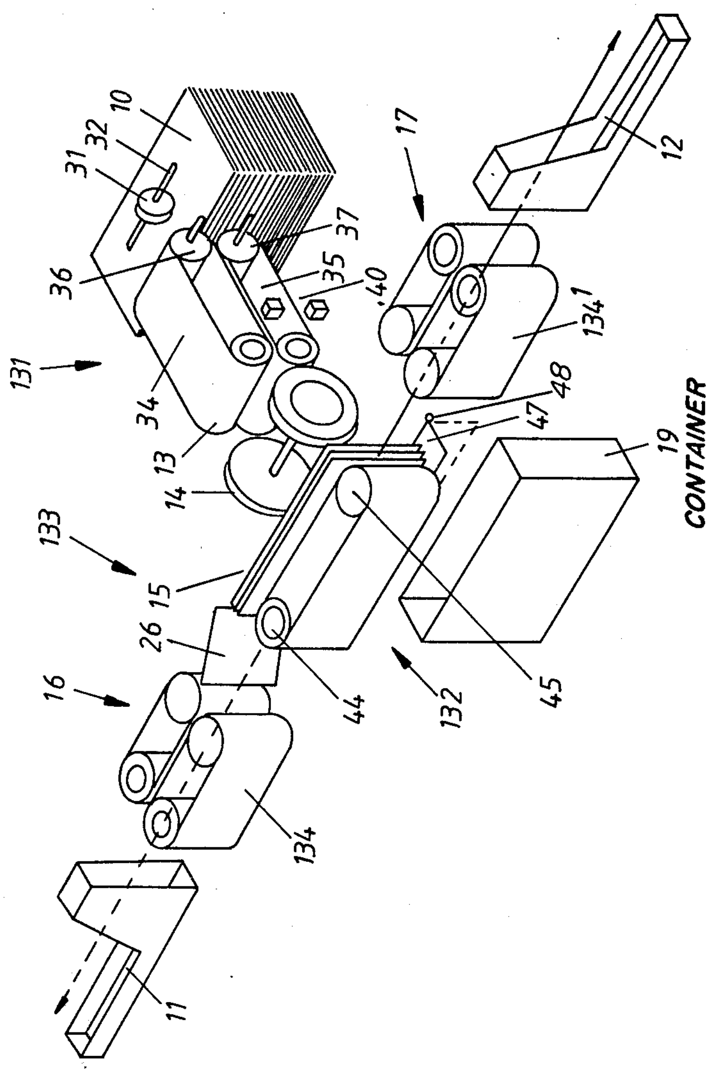
FIGS. 3 and 4 show further details of the apparatus shown in FIG. 1.
Figure 4:
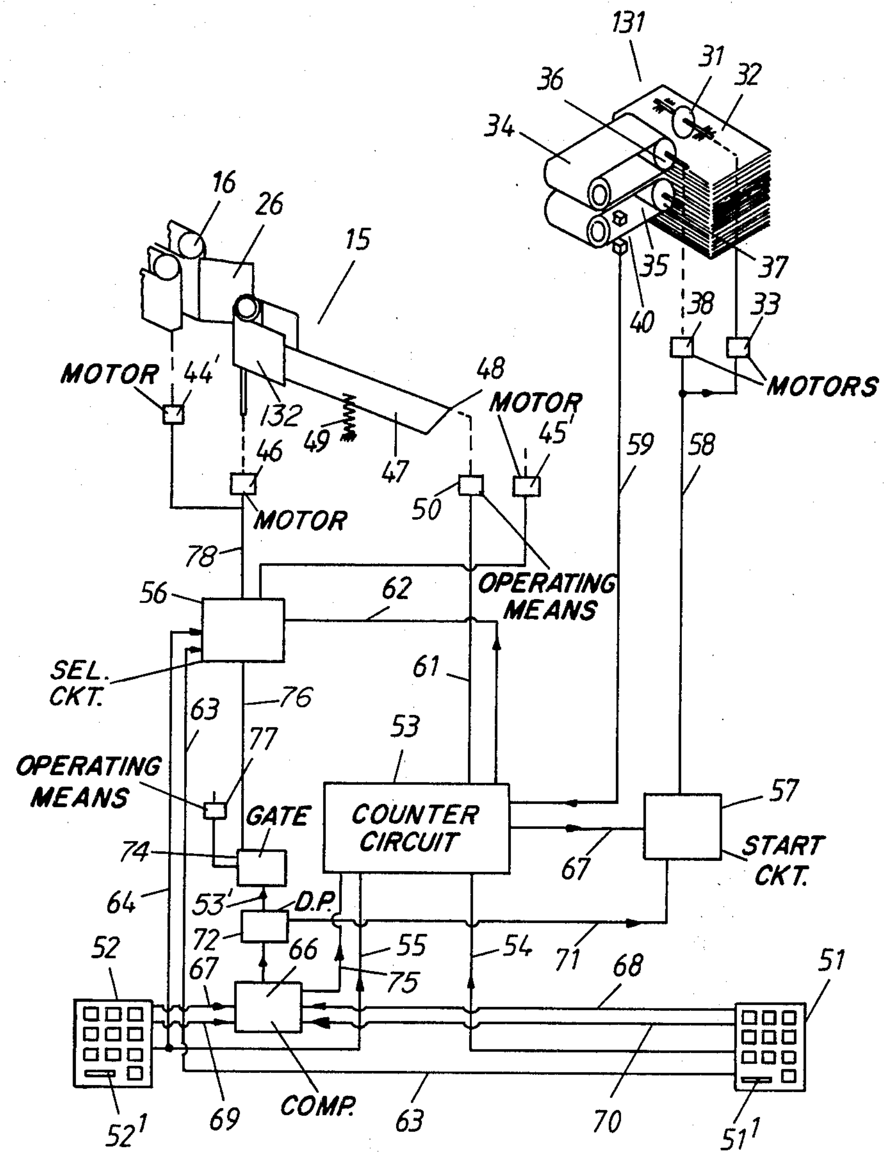

The apparatus illustrated in FIG. 1 will now be described in more detail with reference to an embodiment thereof illustrated in FIGS. 3 and 4. The store or magazine 10, incorporated, for example, in a dispensing apparatus for banknotes of different values and of the kind described in U.S. Pat. No. 4,066,253 is illustrated in FIGS. 3 and 4 by the bunch of banknotes 10. The banknotes are fed, one at a time, by a feed wheel 31, mounted on a shaft 32, which is driven by a motor 33. Each banknote is fed to a conveyor 131, which in the illustrated case comprises two mutually co-acting endless belts 34 and 35, between which the banknotes are fed, one after the other, to two rollers 14 which are mounted on a common shaft and which contribute to transferring the banknotes to the collecting means 15. In the illustrated embodiment, the collecting means 15 is provided with a pivotable, rectangular plate 47, which is mounted on a shaft 48. When the number of banknotes fed from the bundle 10 is given to be correct, the plate 47 is held in a substantially horizontal position by means of a spring 49. If for some reason more than one banknote at a time is taken from the bundle 10, the plate 47 is arranged to be swung to a vertical position, by means of an electric drive means 50, whereupon the banknotes fall down into a container 19 located beneath the plate 47.

In the illustrated embodiment, the collector 15 comprises an endless belt 132, which extends over rollers 44 and 45 having substantially vertical axis of rotation. The roller 44 is driven by a reversible motor 46, to enable the direction in which the roller rotates to be changed in dependence upon whether the banknotes shall be dispensed to the receipt opening 11 or the receipt opening 12. Arranged between the collector 15 and the receipt opening 11 and the receipt opening 12 respectively are holding or retaining means 16 and 17 respectively. Each of these holding means has the form of a conveyor comprising two co-acting, endless belts, which form conveyor 134 and 134' respectively of the FIG. 1 embodiment. Arranged behind the collector 15, which comprises the endless belt 132 extending over rollers 44 and 45 and corresponding to the conveyor 132 in FIG. 1, are two guide plates 26, which together form a channel for guiding a bunch of banknotes into the holding means. For the sake of simplicity, only one guide plate 26 is shown in FIGS. 3 and 4, although it will be understood that these guide plates are arranged in pairs, and that each pair forms the conveyor 133 and 133' respectively shown in FIG. 1. The banknotes are conveyed from the collector 15 to the selected holding means 16 or 17, and from there to a respective receipt opening 11,12, in response to electric signals, as described more in detail hereinafter with reference to FIG. 4.

As illustrated in FIG. 4, the feed roller 31 is driven by the motor 33, which is activated by means of a signal arriving from a start circuit 57 over a line 58. The signal from the circuit 57 via line 58 also activates the drive motor 38, and the banknotes dispensed from the store 10 are then conveyed to the rollers 14, which in the illustrated embodiment are assumed to be driven continuously by means of a motor not shown. Arranged in the feed path of the banknotes are detecting means 40, which may have the form of photoelectric sensors, for example, which are arranged to emit a beam of light for each banknote passing between the belts 34 and 35, and which send a first electric signal, for example a signal having an amplitude of 10 volts, when a single banknote passes through said belts, and a second signal, having an amplitude of, for example, 5 volts, when two banknotes, for example, stuck together, pass simultaneously between the belts. This second signal forms an error signal and, as described hereinafter, causes the banknotes in the collector 15 to be conveyed to the container 19. The first signal forms a counting signal, the counting signals being sent to a counter circuit 53 over line 59.

As before mentioned, the collector 15 has a rectangular plate 47 which is pivotably mounted on a shaft 48 connected to an operating means, for example a motor 50.

The receipt opening 11 co-acts with a keyboard 52, while the receipt opening 12 co-acts with a keyboard 51. Each keyboard 51,52 has buttons or keys numbered from 1 to 0, by which the sum of money desired and the customer's account number can be inserted into the apparatus. In the illustrated embodiment, each keyboard also has a card reader 51' and 52' respectively. The keyboards are connected, over line 63,64, to a selector circuit 56, for selecting the right-hand or the left-hand receipt opening respectively, said selector circuit being connected to a counter circuit 53 over a line 62, this counter circuit also forming an error function circuit. The counter circuit 53 is connected to the start circuit 57, over line 67, and receives counting signals and error signals respectively over line 59. Each keyboard 51,52 has a respective output line 63,64, for supplying intended signals to the selector circuit 56, for controlling the drive motor 46 in a manner to transfer dispensed banknotes from the collector 15 to the holding means 16 or 17 respectively.

Connected to the keyboards 51 and 52 is a comparison circuit 66, which receives over lines 67 and 68 respectively the code read from the customer's card by means of the card reader 51' and 52' respectively.

The customer's code, entered manually on the keyboard is also sent to the comparitor 66, via line 69 and 70. If the code entered manually by the customer agrees with the code on the bankers card the condition is fulfilled for respective holding means 16 and 17 to dispense the ordered banknotes to respective receipt openings, by starting a drive motor 44' coacting with the holding means 16 or a drive motor 45' co-acting with the holding means 17.

For the sake of simplicity, FIG. 4 only shows part of the holding means 16, while the holding means 17 is not shown at all.

The apparatus of the illustrated embodiment has the following operational mode:

When a customer wishes to withdraw a sum of money through the keyboard 52, he or she inserts his or her bankers card into the card reader 52', and inserts their code on the keyboard. The comparitor 66 compares the two codes and, if agreement is found, sends an all-clear signal over a line 71. This all-clear signal opens a gate in the start circuit 57. The all-clear signal is sent at the same time together with the customer's code to the customer's address in a central data processor 72, in which different data concerning the account number is stored, for example information to the effect that the account is overdrawn, that the account is blocked, or that credit can be granted. Subsequent to this check being made, the data processor 72, which may be of any conventional type, sends a signal over a line 53' to a gating circuit 74, to the effect that payment can be made, whereupon the gating circuit 74 is opened and sends an acceptance signal over a line 76 to the selector circuit 56, which in turn starts the motor 44 over a line 78 for dispensing banknotes from the holding means 16, or the motor 45 for dispensing banknotes from the holding means 17, in response to the setting of the selector circuit 56, as described hereinafter. At the same time as the code is inserted on the keyboard 52, a signal is sent to the selector circuit 56 over line 64, this signal being characteristic of the keyboard 52, and sets the selector circuit so that the motor 46 when started dispenses banknotes to the holding means 16 and so that the motor 44' is started. When the keyboard 51 is used, the selector circuit 56 will be set to drive the motor 46 in the opposite direction, i.e. the banknotes are dispensed to the holding means 17 and the motor 45' co-acting therewith is started. If when comparing the two codes a difference is found between the code manually inserted and the code read from the bankers card, the comparitor 66 sends an error signal, over line 75, to the counter circuit 53, to activate a blocking means arranged therein, which prevents further operations from taking place. Means are suitably provided for sending the error signal back to the keyboard, to activate a lamp or the like disclosing that an error has been found in the code inserted.

Immediately the code has been manually inserted, the customer enters on the keyboard 52 the sum required, and a signal corresponding to this sum is sent, via a line 55, to the counter circuit 53, in which the signal is stored. The counter immediately sends a signal to the start circuit 57, over a line 67. The start circuit 57 immediately sends a start signal to the motor 33, which causes the roller 31 to rotate and the motor 38 to be started, to activate rollers 36 and 37. The presence of a dispensed banknote between the belt 34,35 is detected by the detector 40, and a signal is sent over line 59 to the counter circuit 53. When the counter has counted down to zero from the number stored therein, a signal is sent from the counter circuit 53 to the start circuit 57, which stops the motors 38 and 33, thereby preventing further banknotes from being dispensed. As soon as the counter circuit 53 has counted down to zero, meaning that the sum ordered is now located in the collecting means 15, a signal is sent over line 62, via the selector circuit 56, which is set for feeding banknotes to the receipt opening 11 coacting with the keyboard 52, and this signal starts the motor 46 in the correct direction of rotation, and the bundle of banknotes is conveyed to the holding means 16. The drive motor 44' of the holding means 16 obtains, at the same time as the motor 46, a start signal of short duration, via a clock circuit which activates the motor over a period of time sufficient for the bundle of banknotes to be transferred to the holding means 16, but not sufficiently long to enable the bundle to be advanced to the receipt opening 11. When the data processor 72 has carried out all the necessary checks with respect to the owner of the account, an activating signal is sent from the data processor 72, via a line 76 and over the selector circuit 56, which transfers the signal, over the line 78, to the motor 44'. The bundle of banknotes in the holding means 16 is then fed to the receipt opening 11 and the transaction completed.

If, for some reason or other, more than one banknote at a time is fed by the roller 31 to the belts 44,45, the detector 40 will send the aforementioned error signal to the counter circuit 53, which, as mentioned also forms an error circuit. The counter circuit 53 then sends a signal to the operating means 50, via a line 61, causing the plate 47 to swung to a substantially vertical position against the action of spring 49, whereupon the banknotes present in the collector 15 fall into the container 19. Although not shown, each holding or retaining means 16,17 is provided with means for removing banknotes should the data processor 72 send an instruction to the effect that no payment should be made and banknotes have already been transferred to the holding means 16 or 17. Suitably, respective holding means are provided with a plate of the same kind as the illustrated plate 47. The signal from the data processor 72 to the effect that no payment should be made is then sent to an operating means 77 of the same kind as the operating means 50, causing the aforementioned plate (not shown) in the holding means 16 and 17 respectively to be swung downwardly.

As will be evident from the aforegoing, the described apparatus is able to dispense banknotes from a store thereof and to immediately transfer the bundle banknotes to a holding means, while awaiting the result, for example a check on the account number of the customer through a data processor, and that consequently it is not necessary when using said apparatus, which serves a plurality of customers, in the described case two, to await the outcome of such checks before feeding banknotes to a later customer.

It should be noted that the illustrated electric circuits are only intended to illustrate the function of the apparatus, and that one skilled in this art can make several modifications.

I claim:

1. An apparatus for dispensing sheet-like elements from a store (10) of such elements to a plurality of receipt openings (11,12) arranged in said apparatus and accessible to a plurality of individuals, comprising:

conveying means (131–134') for conveying said dispensed sheet-like elements from said store (10) to a predetermined one of said receipt openings;

means for electronically controlling said conveying means (131–134') in response to an order made by any one of said individuals for said sheet-like elements so that said conveying means conveys ordered sheet-like elements from said store (10) to said predetermined receipt opening (11) in a form of a bundle;

said conveying means comprising for each receipt opening retaining and holding means (16,17) which is individually alotted to said receipt openings (11,12) and which retains said ordered sheet-like elements for a time period determined by said electronic control means.

2. The apparatus according to claim 1, further comprising collecting means (15) for collecting said ordered sheet-like elements for all of said receipt openings in said bundle form; said retaining and holding means for each receipt opening (16–17) forming a waiting station arranged to receive the bundle of sheet-like elements fed from said collecting means (15), and to hold said bundle for said time period.

3. The apparatus according to claim 1, wherein each of said retaining and holding means (e.g 16) comprises collecting means (25,25') for collecting said ordered sheet-like elements in said bundle form, each of said collecting means being individually alotted to said respective receipt opening (11,12).

4. The apparatus according to claim 1, wherein said conveying means (131–134') comprises a feed wheel (31) and a conveyor (131), said conveyor comprising:

two mutually co-acting first endless belts (34,35) between which said ordered sheet-like elements are fed; and two first rollers (14) which transfer said ordered sheetlike elements from said first endless belts to said collecting means (15).

5. The apparatus according to claim 4, wherein said collecting means (15) comprises:

two second rollers (44, 45);

a second endless belt (132) extending around said second rollers;

a reversible motor (46) for changing a direction of rotation of said second rollers;

a shaft (48);

a pivotable rectangular plate (47) mounted on said shaft for selectively directing said ordered sheet-like elements to said second endless belt (132); and a spring (49) for biasing said plate.

6. The apparatus according to claim 5, wherein each of said retaining and holding means (16,17) comprises two co-acting third endless belts (134,134') and two guide plates (26) which together form a channel for guiding said ordered sheet-like elements.

7. The apparatus according to claim 6, further comprising a discharge container (19), said electronic control means comprising means (40) for generating electronic signals determinative of whether a single or plural of said ordered sheet-like elements pass between said two first endless belts (34,35) said electronic signal generating means generating an error signal when a plurality of said ordered sheet-like elements are determined so that said determined plurality of ordered sheet-like elements are discharged into said discharge conveyor (19);

means (66) for determining whether a code entered on a keyboard (52) is accurate.

* * * * *